(12) United States Patent
Pham et al.

(10) Patent No.: US 8,978,729 B2
(45) Date of Patent: Mar. 17, 2015

(54) COMPOSITE PLY STABILIZING SYSTEM

(71) Applicant: The Boeing Company, Chicago, IL (US)

(72) Inventors: Doan D. Pham, Tacoma, WA (US); Mark W. Tollan, Puyallup, WA (US); Richard M. Outzen, Snohomish, WA (US); John C. Lockleer, Everett, WA (US); Christopher G. Harris, Auburn, WA (US)

(73) Assignee: The Boeing Company, Chicago, IL (US)

( * ) Notice: Subject to any disclaimer, the term of this patent is extended or adjusted under 35 U.S.C. 154(b) by 167 days.

(21) Appl. No.: 13/924,508

(22) Filed: Jun. 21, 2013

(65) Prior Publication Data

US 2013/0276987 A1 Oct. 24, 2013

Related U.S. Application Data

(62) Division of application No. 12/638,947, filed on Dec. 15, 2009, now Pat. No. 8,491,743.

(51) Int. Cl.
*B32B 27/00* (2006.01)
*B32B 37/10* (2006.01)
(Continued)

(52) U.S. Cl.
CPC .............. *B32B 37/10* (2013.01); *Y10T 156/10* (2015.01); *Y10T 156/1092* (2015.01); *B29C 70/44* (2013.01); *B29C 70/541* (2013.01); *B29C 70/543* (2013.01); *B29D 99/0021* (2013.01); *Y02T 50/433* (2013.10)

USPC ............ 156/494; 156/500; 425/389; 425/397

(58) Field of Classification Search
CPC ...... B32B 37/10; B29C 70/44; B29C 70/543; B29C 70/541; B29D 99/0021; Y02T 50/433; Y02T 50/43; Y10T 156/1092; Y10T 156/10
USPC ........... 156/229, 242, 299, 494; 425/389, 397
See application file for complete search history.

(56) References Cited

U.S. PATENT DOCUMENTS

| 5,290,167 A | 3/1994 | Tanaka et al. |
| 5,685,940 A | 11/1997 | Hopkins et al. |

(Continued)

FOREIGN PATENT DOCUMENTS

| JP | 3130064 | 3/2007 |
| WO | PCTUS95101099 | 8/1996 |
| WO | PCTSE0002656 | 7/2001 |

OTHER PUBLICATIONS

Internatinonal Search Report, PCTUS2010056470, Apr. 20, 2011.

(Continued)

*Primary Examiner* — William Bell

(57) ABSTRACT

A stabilizing mechanism for resisting relative movement of upper and lower laminates of a composite structure having a core comprises a lower grip strip and at least one upper grip strip. The lower grip strip may be mounted to a tool upon which the composite structure may be processed. The lower grip strip may include an outer surface having at least one engagement feature for engaging at least one of the upper and lower laminates which make up the composite structure. The upper grip strip may have opposing outer surfaces which may include at least one engagement feature for engaging the lower strip and at least one of the upper and lower laminates.

14 Claims, 8 Drawing Sheets

(51) Int. Cl.
  *B29C 70/44* (2006.01)
  *B29C 70/54* (2006.01)
  *B29D 99/00* (2010.01)
  *B64C 3/20* (2006.01)

(56) References Cited

U.S. PATENT DOCUMENTS

| | | | |
|---|---|---|---|
| 5,897,739 A | | 4/1999 | Forster et al. |
| 6,045,651 A | * | 4/2000 | Kline et al. ............ 156/285 |
| 6,551,441 B1 | | 4/2003 | Sato et al. |
| 6,814,563 B2 | | 11/2004 | Amnered et al. |
| 2001/0030380 A1 | | 10/2001 | Fujihira |
| 2003/0190452 A1 | | 10/2003 | Lucas et al. |
| 2005/0051262 A1 | | 3/2005 | Erickson et al. |

OTHER PUBLICATIONS

Internatinonal Search Report, PCTUS9501099, Feb. 5, 1996.
Internatinonal Search Report, PCTSE0002656, Apr. 2, 2001.

* cited by examiner

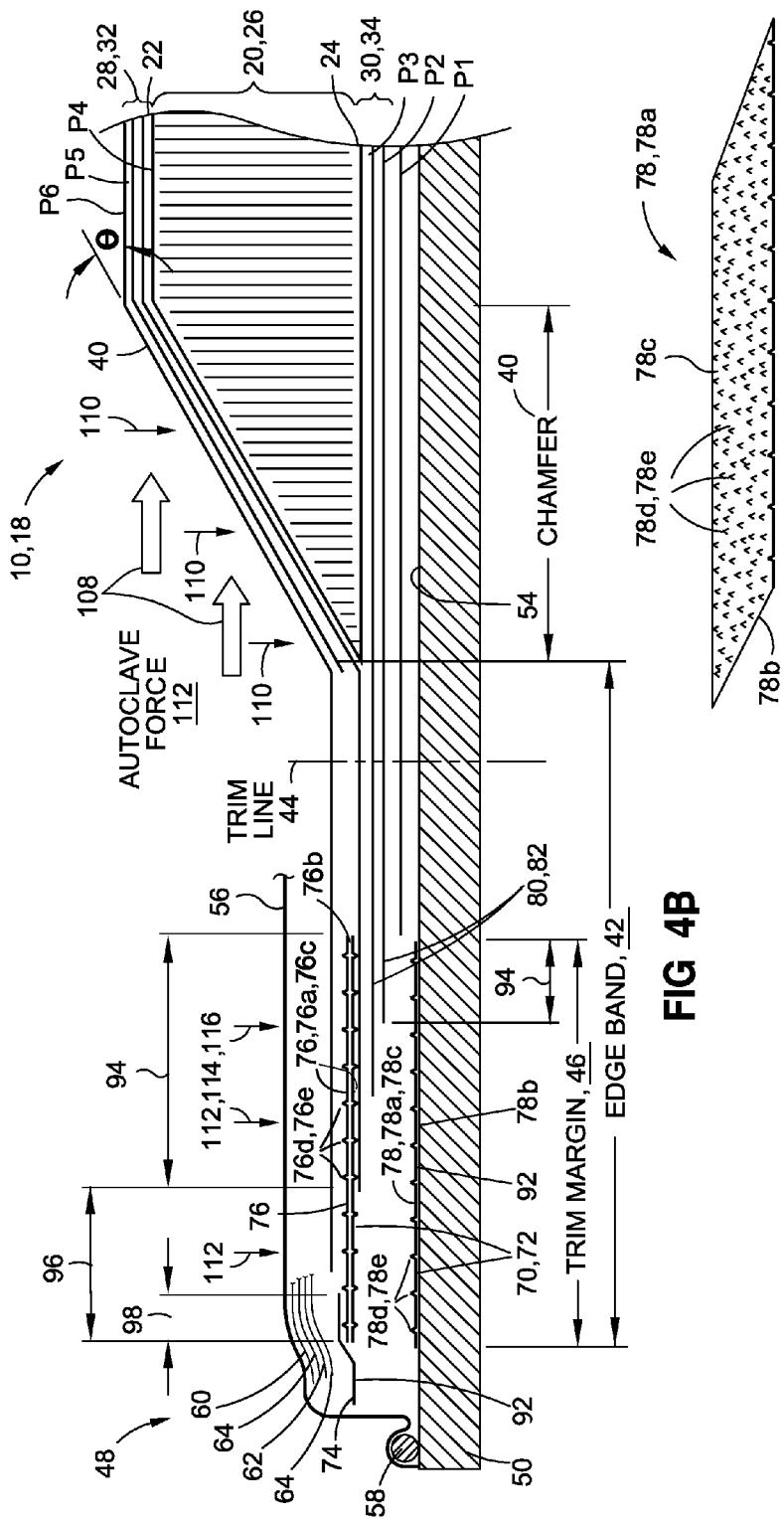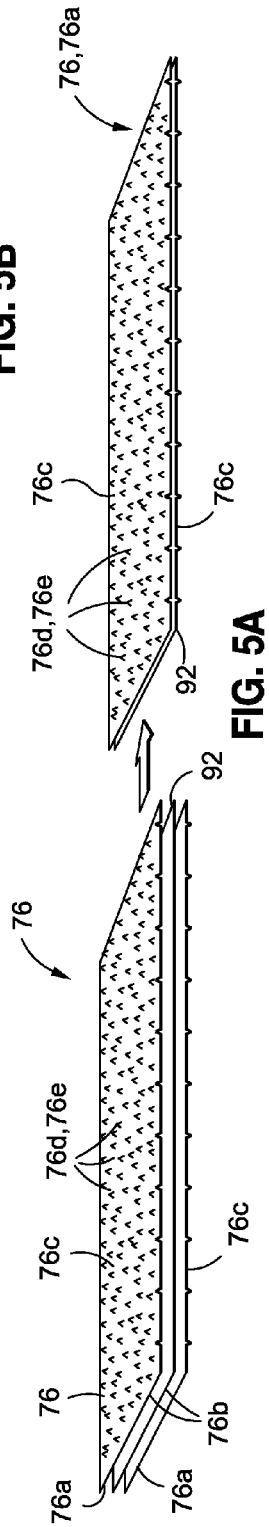

COMPOSITE PLY STABILIZING SYSTEM

CROSS-REFERENCE TO RELATED APPLICATIONS

The present application is a divisional application of and claims priority to U.S. application Ser. No. 12/638,947 filed on Dec. 15, 2009, and entitled COMPOSITE PLY STABILIZING METHOD, now U.S. Pat. No. 8,491,743, the entire contents of which is expressly incorporated by reference herein.

FIELD

The present disclosure relates generally to composite construction and, more particularly, to a system and method of stabilizing composite plies against movement relative to one another.

BACKGROUND

Composite sandwich structures constructed of honeycomb core or other lightweight core materials provide several advantages over other composite structural arrangements. Sandwich structures typically include the core material bounded on opposing sides of the core by face sheets or laminates comprised of one or more plies of composite material. Due to the relatively light weight of the core, the combination of the core and laminates on opposing sides of the core results in a relatively high stiffness-to-weight ratio as compared to composite structures comprised of laminated plies. In addition, composite sandwich structures have relatively high strength-to-weight ratios due to the relatively low density of the core material. Certain structures such as, without limitation, wing flaps and/or doors of a commercial airliner may benefit from a composite sandwich construction due to the favorable stiffness characteristics and light weight.

During the fabrication of a composite structure, pressure and heat are typically applied to a layup of composite materials that make up the structure in order to cure and bond the composite materials. An autoclave may be employed as a means for applying heat and pressure to the composite material layup such as a composite sandwich structure layup. For the above-noted example of a wing flap formed with lightweight core material, the geometry and size of the flap may present challenges regarding the curing and bonding of the composite materials to the core.

For example, the wing flap of a commercial airliner may have relatively large core thicknesses (e.g., six inches or larger) with a trend toward increasing core thicknesses in response to ongoing efforts to minimize weight in composite structures. The wing flap may also include one or more chamfers for tapering the core thickness such as along a direction toward the perimeter of the flap. The chamfer angle may exceed 10 degrees and may be as large as 20 degrees or greater depending upon the flap geometry. For such a configuration, the pressure exerted by the autoclave (e.g., approximately 45 psi) may result in the application of a relatively large side load (e.g., up to 4,000 pounds) on the chamfer of the core. The relatively large side load may result in movement or slippage of the plies of the upper and lower laminates relative to one another along a direction from the flap perimeter toward the core chamfer. Furthermore, the heating of the plies between which the core is sandwiched may reduce the viscosity of the resin that is in contact with the core and which may reduce friction and further facilitate ply slippage. The slippage of the plies relative to one another may result in movement of the core causing the core to be compacted or crushed in response to the ply movement.

Prior art attempts to prevent core crush include the application of film adhesive and a fiberglass sheet around the border of the composite panel in an effort to stabilize the core from movement during the application of autoclave pressure. Unfortunately, the fiberglass sheet extends across the surface of the core resulting in additional weight to the structure. Other attempts to prevent core crush include the application of tie down straps along the perimeter of the composite layup. The tie down straps may comprise fiberglass straps that may be secured to the tool and extended over and adhered to the uppermost ply of the composite layup. However, such tie down straps may be ineffective against the relatively large side forces exerted on chamfers of large surface area during the application of autoclave pressure.

Another approach to preventing ply slippage in composite structures is to septumize or split the core along a horizontal plane at an approximate mid-height of the core. Layers of fiberglass and adhesives may be installed between upper and lower portions of the split core in an attempt to stabilize the core against movement. Unfortunately, the addition of the fiberglass and adhesive layers may eliminate the ability to perform a non-destructive inspection of the composite panel using ultrasonic inspection techniques due to blockage of the ultrasonic signal by the fiberglass layer. Furthermore, the addition of the fiberglass sheet and adhesive may add to the weight of the composite structure.

As can be seen, there exists a need in the art for a system and method for stabilizing the plies of a composite structure against movement relative to one another in order to prevent core crush during the application of pressure to the composite structure as may occur during curing and/or consolidation of the structure. Furthermore, there exists a need in the art for a system and method for stabilizing the plies of a composite structure that is effective for relatively thick cores having a chamfer formed at a relatively steep chamfer angle. Finally, there exists a need in the art for a system and method for stabilizing the plies of a composite structure against movement without requiring the addition of materials that may increase the weight of the composite structure.

SUMMARY

Disclosed is a stabilizing mechanism for resisting relative movement of upper and lower laminates of a composite structure having a core. The upper and lower laminates may be mounted to the core. The stabilizing mechanism may comprise a lower grip strip mounted to the tool and may have an outer surface and may include at least one engagement feature for engaging at least one of the upper and lower laminates. The stabilizing mechanism may include at least one upper grip strip which may have opposing outer surfaces wherein each one of the outer surfaces may include at least one of the engagement features for engaging the lower grip strip and at least one of the upper and lower laminates.

Also disclosed is a stabilizing mechanism for resisting relative movement of the upper and lower laminates which may be mounted to a chamfered core of a composite structure to prevent core crush of the chamfered core. The composite structure may be mounted on a tool. Core crush may occur under the application of autoclave force to the chamfer formed in the core. The composite structure may include upper and lower laminates respectively mounted to upper and lower surfaces of the core. The upper and lower laminates may be respectively comprised of upper and lower plies. The composite structure may have a perimeter that may include a trim line defining a trim margin. The stabilizing mechanism may comprise a lower grip strip bonded to the tool within the trim margin and may include a generally elongate metallic sheet member having inner and outer surfaces. The stabilizing mechanism may include a plurality of protrusions extending outwardly from the outer surface. The protrusions from the lower grip strip may engage at least two of the plies for preventing movement relative to the lower grip strip.

The stabilizing mechanism may include at least one upper grip strip that may be positioned in substantial alignment with the lower grip strip and may comprise a pair of the sheet members bonded at the inner surfaces in back-to-back arrangement. Each one of the sheet members may have a plurality of the protrusions extending outwardly from the respective outer surfaces. The protrusions from the upper grip strip may engage the lower grip strip for preventing movement relative thereto and may engage at least two of the plies on opposing sides of the upper grip strip for preventing movement of the plies relative to the upper grip strip. At least one tie strap may be mounted to the tool and may overlap a portion of the upper grip strip. A bagging film may seal the composite structure to the tool for applying compressive force on the upper and lower laminates to increase engagement with the upper and lower grip strips.

The present disclosure further includes a system for resisting relative movement of upper and lower laminates mounted to a chamfered core of a composite structure to reduce core crush of the chamfered core. The system may comprise a tool for receiving the composite structure and a stabilizing mechanism. The stabilizing mechanism may include a lower grip strip mounted to the tool and which may have an outer surface that includes at least one engagement feature for engaging at least one of the upper and lower laminates. The stabilizing mechanism may include at least one upper grip strip which may have opposing outer surfaces each of which may include at least one engagement feature for engaging the lower grip strip and at least one of the upper and lower laminates. The system may include a force mechanism for applying a compressive force to the upper laminate for increasing the engagement of the upper and lower laminates to the upper and lower grip strips.

Also disclosed is a method of resisting relative movement of upper and lower laminates mounted to a chamfered core of a composite structure to reduce core crush in the chamfered core. The method may comprise the steps of mounting a lower grip strip to a tool and laying up a lower laminate on the tool such that the lower laminate engages a portion of the lower grip strip. The method may further comprise placing a core on the lower laminate, positioning an upper grip strip such that a portion thereof engages the lower grip strip, and laying up an upper laminate over the core such that a portion of the upper laminate engages the upper grip strip.

In a further embodiment, disclosed is a method of resisting relative movement of upper and lower laminates mounted to a chamfered core of a composite structure to reduce core crush in the chamfered core under the application of autoclave force to the chamfer. The composite structure may be mounted on a tool and may have a perimeter that may include a trim line defining a trim margin. The core may have at least one chamfer. The method may comprise the steps of bonding a lower grip strip to the tool within the trim margin. The lower grip strip may have protrusions extending outwardly from an outer surface thereof. The method may include laying up lower plies of the lower laminate onto the tool such that at least two of the lower plies engage a portion of the lower grip strip. The lower plies may be terminated in staggered relation to one another on the lower grip strip.

The method may include positioning the core over the lower laminate within the trim line, positioning at least one upper grip strip in substantial alignment with the lower grip strip and engaging the upper grip strip to a portion of the lower grip strip. The method may include laying up upper plies of an upper laminate over the core such that at least two of the upper plies overlap and engage a portion of the upper grip strip. The upper plies may terminate in staggered relation to one another on the upper grip strip. The method may also include mounting at least one tie strap to the tool and extending the tie strap over at least a portion of the upper grip strip and along a length thereof. A compressive force may be applied to the composite structure to increase engagement of the upper and lower laminates to the upper and lower grip strips.

BRIEF DESCRIPTION OF THE DRAWINGS

These and other features of the present disclosure will become more apparent upon reference to the drawings wherein like numbers refer to like parts throughout and wherein:

FIG. 4B is a cross-sectional illustration of the composite structure taken along line 4B-4B of FIG. 3 and illustrating the stabilizing mechanism for resisting ply movement and wherein the stabilizing mechanism may comprise a lower grip strip mounted to the tool and an upper grip strip engageable to the lower grip strip and to at least one of the upper and lower laminates;

FIG. 5A is a perspective illustration of the upper grip strip in an embodiment formed from a pair of sheet members bonded together in back-to-back arrangement;

FIG. 5B is a perspective illustration of the lower grip strip in an embodiment formed from one of the sheet members;

DETAILED DESCRIPTION

Figure 1:
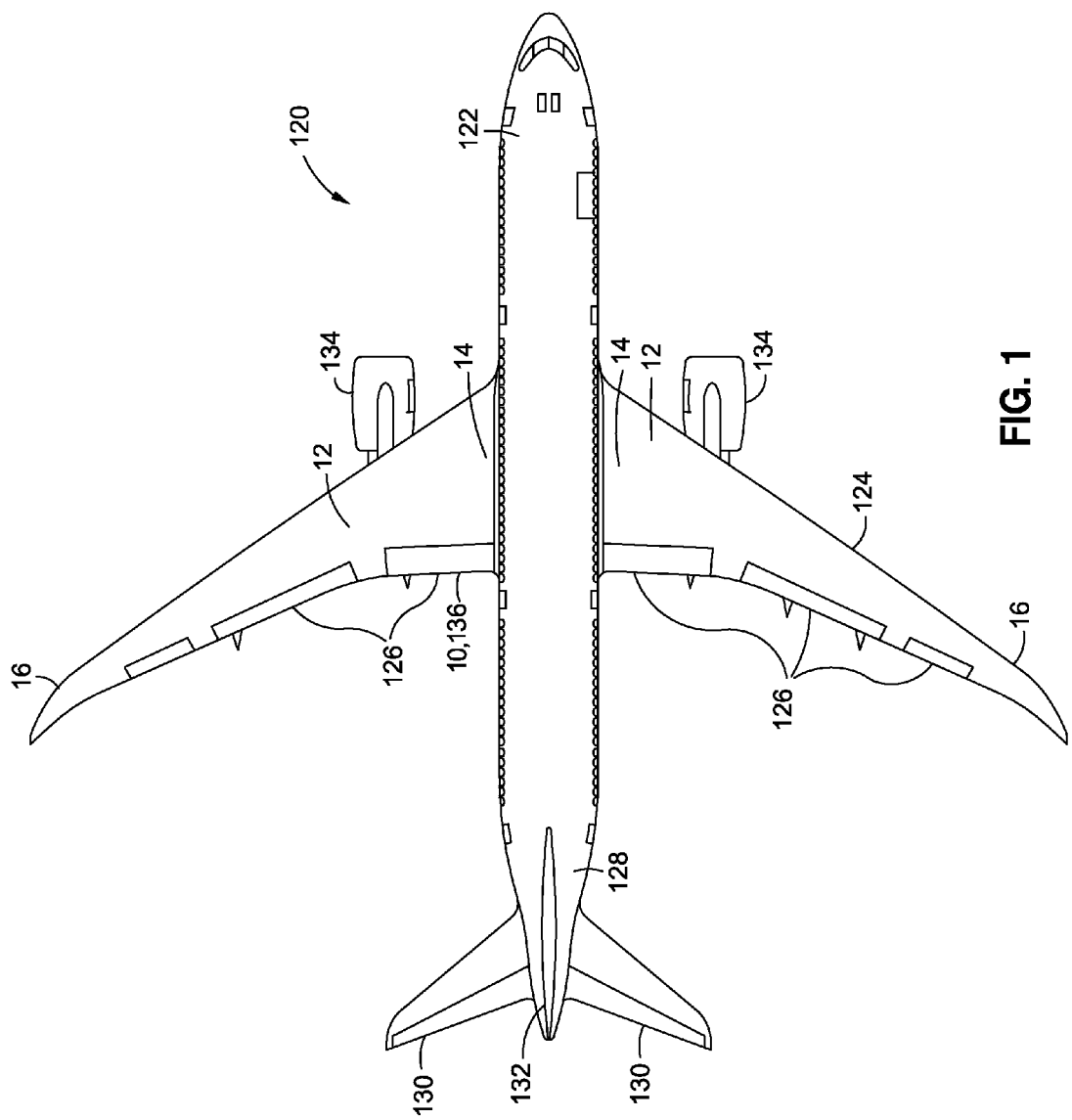
FIG. 1 is a top view of an aircraft which may include a composite structure for which a stabilizing mechanism preventing ply movement may be implemented.

Referring now to the drawings wherein the showings are for purposes of illustrating preferred and various embodiments of the disclosure only and not for purposes of limiting the same, shown in FIG. 1 is a plan view of an aircraft 120 as an example of one of a variety of applications where a stabilizing mechanism 72 (FIGS. 2-3) may be implemented for preventing relative ply 32, 34 (FIG. 2) movement during fabrication of a composite structure 10. As can be seen in FIG.

1, the aircraft 120 includes a pair of wings 124 extending outwardly from a fuselage 122 from inboard 14 to outboard 16 and having propulsion units 134. The aircraft 120 may include a tail section 128 having a horizontal stabilizer 130, a vertical stabilizer 132, and/or other control surfaces 126. The aircraft 120 may include other components which may advantageously incorporate the use of the stabilizing mechanism 72 (FIGS. 2-3) as disclosed herein during the fabrication of the composite structures 10.

For example, the aircraft 120 may include one or more wing flaps 136 which may be formed as a composite structure 10 benefiting from the stabilizing mechanism 72 (FIGS. 2-3) in preventing ply 32, 34 (FIG. 2) movement and core 20 (FIG. 2) crush during the fabrication process. In this regard, it should be noted that although the stabilizing mechanism 72 as disclosed herein is described with regard to a wing flap 136 as may be used in an aircraft 120, the stabilizing mechanism 72 may be implemented in the fabrication of a composite structure 10 for any vehicular or non-vehicular application and for use in any industry including, without limitation, the marine and automotive industries. Furthermore, the stabilizing mechanism 72 and method disclosed herein is not limited for use in sandwich panels having a lightweight open cell core such as honeycomb core 20, but may include the fabrication of any composite structure 10 comprised of layered plies 32, 34 (FIG. 2) wherein ply movement may occur.

Figure 2:
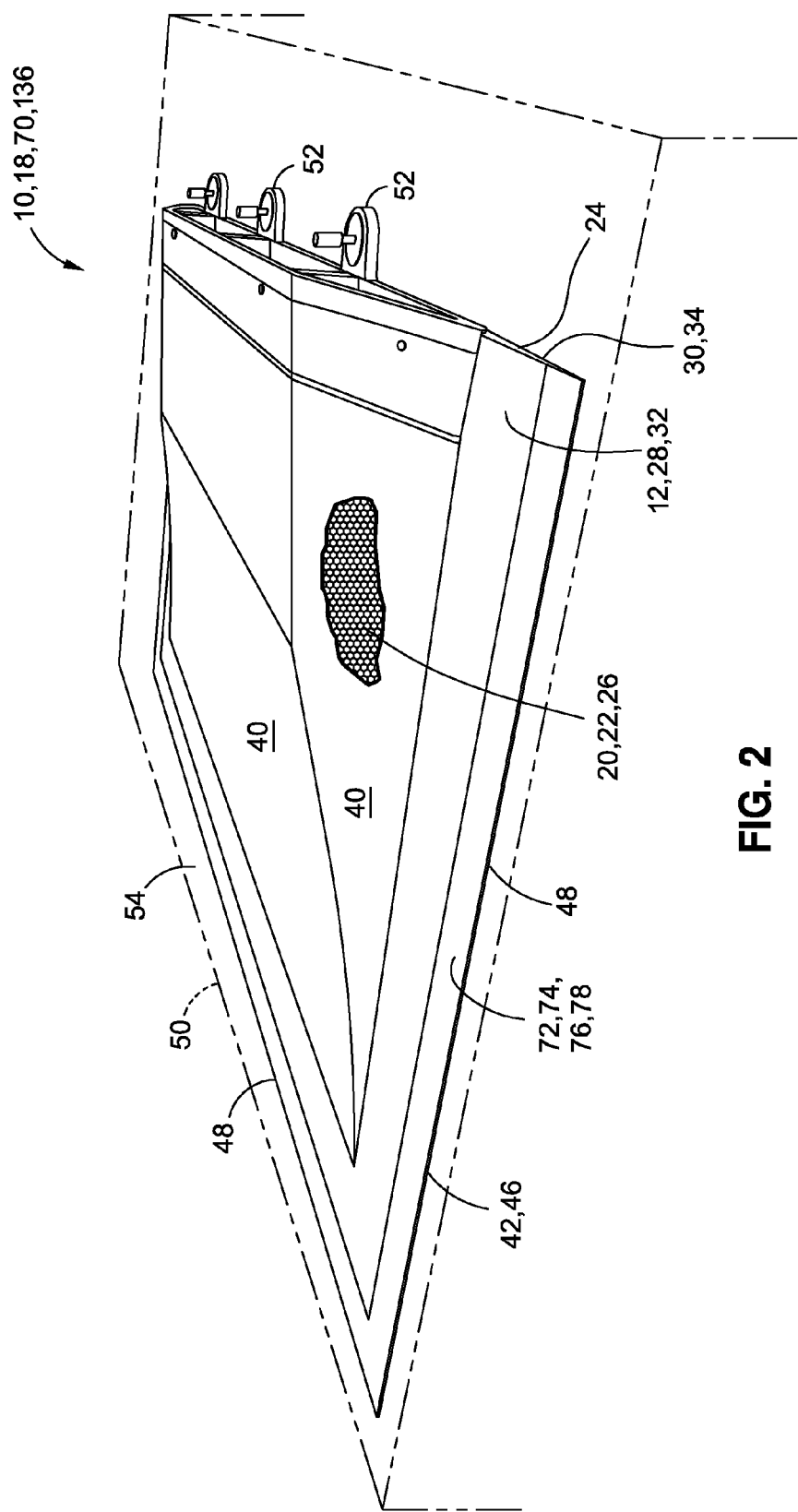
FIG. 2 is a perspective illustration of a layup of a composite structure configured as a wing flap and which is mounted on a tool and further illustrating upper and lower laminates of the composite structure having a core sandwiched therebetween.

Referring to FIG. 2, shown is the composite structure 10 configured as a wing flap 136 and mounted on a tool 50 as may be used for the layup and preparation of the composite structure 10 prior to consolidating and/or curing of the composite structure 10. Although shown configured as a wing flap 136 in FIG. 2, the composite structure 10 may be configured in a variety of alternative shapes, sizes and configurations without limitation and which may benefit from the stabilizing mechanism 72 as disclosed herein. The tool 50 may include tooling fixtures 52 for restraining the composite structure 10 during the fabrication process. The composite structure 10 may be laid on a tool surface 54 of the tool 50 as illustrated in FIG. 2. The tool 50 may also be transportable such that the composite structure 10 may be moved from a layup facility to an autoclave facility for the application of heat and/or pressure during cure.

As can be seen in FIG. 2, the composite structure 10 may include upper and lower laminates 28, 30 between which the core 20 may be sandwiched. The composite structure 10 may include a perimeter 48 along which the stabilizing mechanism 72 may be located. The lower laminate 30 may be comprised of lower plies 34 upon which the core 20 may be mounted. The upper laminate 28 may be comprised of upper plies 32 which may be laid over the core 20 and which may also overlap the lower laminate 30 at the edge of the core 20 to form a skin member 12. The core 20 may be formed of any suitable core 20 material including, but not limited to, metallic materials such as aluminum, aramid, fiberglass or any other suitable material. Likewise, the upper and lower plies 32, 34 which respectively comprise the upper and lower laminates 28, 30 may be formed of any suitable materials such as, without limitation, pre-impregnated woven fabric or uni-directional tape material.

Figure 3:
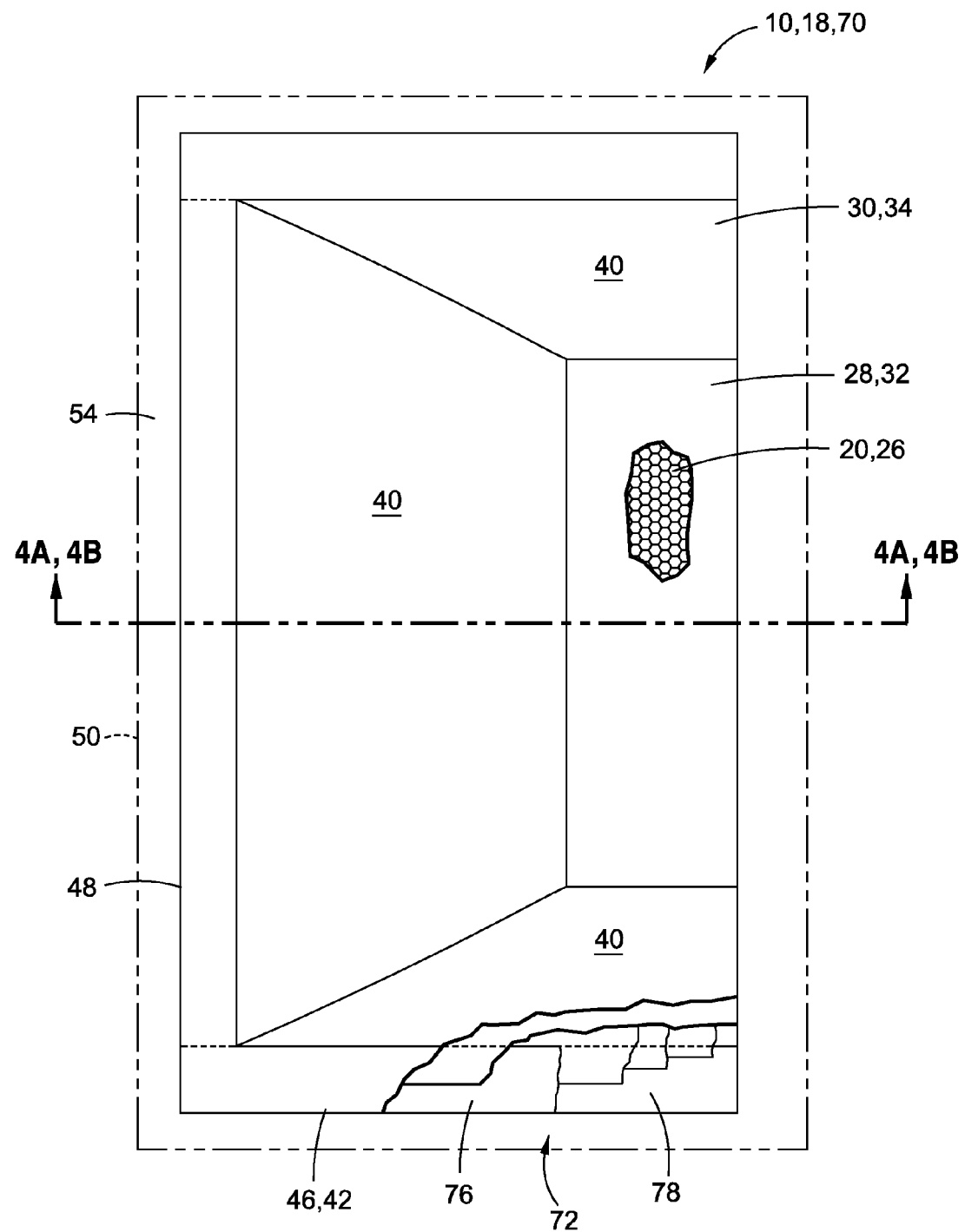
FIG. 3 is a top view of the composite structure mounted on the tool.

As can be seen in FIG. 2, the composite structure 10 may include one or more chamfers 40 which may be formed at any angle. The stabilizing mechanism 72 as disclosed herein may at least substantially prevent ply movement such as along a direction from the perimeter 48 toward the core chamfer 40. The stabilizing mechanism 72 may be disposed around the perimeter 48 of the composite panel 18 as illustrated in FIGS. 2 and 3. The stabilizing mechanism 72 may prevent core crush of the chamfered core 20 under the application of pressure to the composite structure 10 such as during consolidation and/or curing. The process of curing of the composite structure 10 may include bonding of the upper and lower laminates 28, 30 to respective ones of the upper and lower surfaces 22, 24 of the core 20 material.

Referring particularly now to FIG. 3, shown is a plan view of the composite structure 10 mounted on the tool 50 and illustrating the perimeter 48 of the composite structure 10 upon which the stabilizing mechanism 72 may be located. As can be seen in FIG. 3, the upper laminate 28 may be formed of the upper plies 32 which are illustrated as being partially broken away in FIG. 3 in order to illustrate the overlap of the upper laminate 28 over the stabilizing mechanism 72. The stabilizing mechanism 72 may comprise a lower grip strip 78 which may be bonded to the tool 50 at the inner surface or otherwise mounted to the tool 50. In addition, the stabilizing mechanism 72 may include at least one upper grip strip 76 which may optionally be disposed in substantial alignment with the lower grip strip 78 and may be engaged to the lower grip strip 78. The upper and lower grip strips 76, 78 may be engaged to the upper and lower laminates 28, 30 in order to resist, restrict or prevent relative movement of the upper and lower plies 32, 34 which make up the upper and lower laminate 28, 30. In this manner, the stabilizing mechanism 72 may resist movement of the core 20 to which the upper and lower laminates 28, 30 are mounted within the composite structure 10. In this manner, the stabilizing mechanism 72 may minimize or eliminate core crush of the core 20.

Figure 4A:
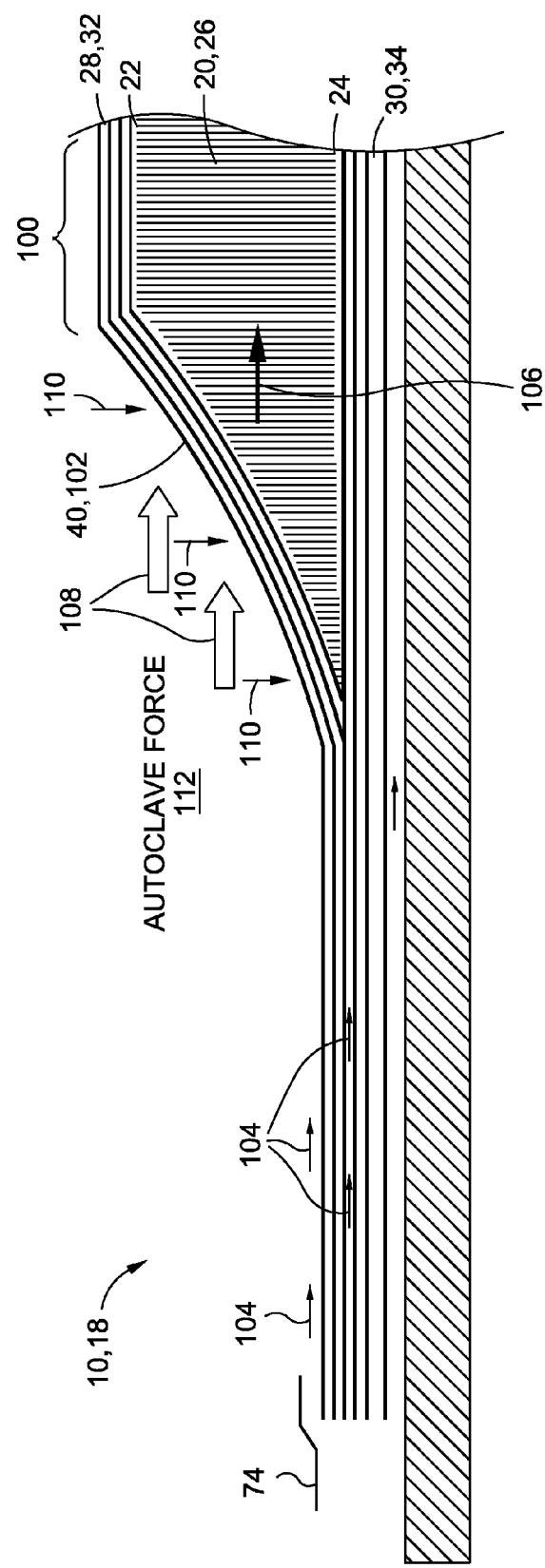
FIG. 4A is a cross-sectional illustration of the composite structure taken along 4A-4A of FIG. 3 and illustrating ply movement that may occur without the implementation of an embodiment of the stabilizing mechanism.

For example, and referring to FIG. 4A, shown is a cross-sectional illustration of the composite structure 10 in an embodiment having a tie strap 74 mountable to the tool 50 and extending partially over the plies 32, 34. As can be seen in FIG. 4A, ply movement 104 occurs in the plies 32, 34 resulting in movement of the core 20 causing core crush 100. The area of core crush 100 is illustrated as having a generally increased density of the individual cells 26 that make up the core 20. In this regard, core movement 106 and core crush 100 may occur as a result of compaction of the core cells 26 in response to the side force 108 exerted on the chamfer 40 by the autoclave force 112 generated by autoclave pressure 110 or other external pressure applied to the chamfer 40. As a result, the chamfer 40 portion of the composite structure 10 may exhibit panel sag 102 or deformation. For relatively large thicknesses of the core 20 (e.g., greater than six inches) and for relatively large chamfer angles θ (e.g., greater than 10 degrees), the magnitude of the autoclave force 112 or side force 108 may be sufficient to cause core crush 100 in the absence of a mechanism for restricting movement of the plies 32, 34.

Referring now to FIG. 4B, shown is a cross-sectional illustration of the composite structure 10 having the stabilizing mechanism 72 engaged to the upper and lower laminates 28, along the perimeter 48 of the structure 10. The stabilizing mechanism 72 is configured to resist movement of the plies 32, 34 along a direction from the perimeter 48 toward the core chamfer 40. The stabilizing mechanism 72 may resist movement of the plies 32, 34 which may resist or prevent movement of the core 20. As can be seen in FIG. 4B, the stabilizing mechanism 72 may include at least one upper grip strip 76 and a lower grip strip 78 engaged to the upper grip strip 76. The lower grip strip 78 may be formed as a sheet member 78a and may be mounted to the tool 50 such as by bonding an inner surface 78b of the lower grip strip 78 to the tool 50 using an adhesive 92. However, the lower grip strip 78 may be mounted to the tool 50 by any suitable means including, without limitation, bonding and/or mechanical fastening. The stabilizing mechanism 72 may preferably be located within an edge band 42 of the tool 50 in order to allow for trimming or removal of the stabilizing mechanism 72 upon completion of curing or consolidating of the composite structure 10. FIG. 4B illustrates a trim line 44 defining a trim margin 46 along the perimeter 48 of the composite structure. The stabilizing mechanism 72 is preferably located within the trim margin 46.

Referring still to FIG. 4B, the lower grip strip 78 may be mounted to the tool 50 and may include an outer surface 78c having at least one engagement feature 78d such as a protrusion 78e for engaging at least one of the upper and lower laminates 28, 30. For example, the lower laminate 30 may include three plies P1, P2 and P3 which may extend over the lower grip strip 78 in overlapping relation thereto within a ply-strip overlap 94 region. The ply-strip overlap 94 may be provided in any width such as a one inch overlap of each lower ply 34 with the lower grip strip 78. The amount of ply-strip overlap 94 is preferably sufficient to facilitate engagement of the lower plies 34 to the lower grip strip 78 to resist movement of the lower plies 34.

Although FIG. 4B illustrates three plies 34 as being engaged to the lower grip strip 78, any number of lower plies 34 may be engaged to the lower grip strip 78 and in any amount of ply-strip overlap 94. In this regard, it is contemplated that only a single ply 34 may be engaged in overlapping relation to the lower grip strip 78. The amount of overlap of the plies 34 with the lower grip strip 78 may be dictated in part by the width of the lower grip strip 78. In an embodiment, the lower grip strip 78 may be provided in a width of three inches or in a width of six inches. Likewise the upper grip strip 76 may be provided in a width of three or six inches depending upon material availability. However, the lower grip strip 78 and upper grip strip 76 may be provided in any width or in any combination of widths along the perimeter 48 of the composite structure 10.

Referring still to FIG. 4B, the upper grip strip 76 is illustrated as being optionally oriented in substantial alignment with the lower grip strip 78. In this regard, the upper grip strip 76 may be formed of the same or similar material as the lower grip strip 78. For example, the upper grip strip 76 may be formed as a pair of sheet members 76a joined at inner surfaces 76b by adhesive 92 (FIG. 5A) although the upper grip strip 76 may be formed as a unitary structure of any suitable configuration. In this regard, the upper and lower grip strips 76, 78 may be formed of similar or dissimilar materials. The upper grip strip 76 is preferably disposed such that the upper laminate 28 is engaged thereto. More particularly, the upper plies 32 that comprise the upper laminate 28 may be engaged in overlapping relation to the upper grip strip 76. As can be seen in FIG. 4B, the plies P4 and P5 of the upper laminate 28 may be disposed on opposing sides of the upper grip strip 76. However, it is also contemplated that the lower laminate 30 and upper laminate 28 may be directly engaged to the upper grip strip 76.

For example, ply P3 of the lower laminate 30 may be engaged to a bottom side of the upper grip strip 76 while ply P4 of the upper laminate 28 may be engaged to a top side of the upper grip strip 76. In this regard, the upper grip strip 76 may be formed as a sheet member 76a and may have at least one engagement feature 76d such as a protrusion 76e formed on each one of the outer surfaces 76c of the upper grip strip 76 for engaging the lower grip strip 78 and/or for engaging at least one of the upper and lower laminates 28, 30. As can be seen, the arrangement of the upper laminate 28 and lower laminate 30 relative to the upper grip strip 76 provides a variety of configurations for layering the upper plies 32 and lower plies 34 relative to the upper grip strip 76. Notably, the upper grip strip 76 is engaged along a portion of the lower grip strip 78 and is also preferably engaged to one or more of the upper plies 32 of the upper laminate 28.

Referring still to FIG. 4B, it can be seen that the upper grip strip 76 overlaps the lower grip strips 78 by the amount indicated as the grip strip overlap 96. In an embodiment, the grip strip overlap 96 may measure approximately two inches for a grip strip width of approximately six inches. In this regard, the amount of the grip strip overlap 96 may comprise approximately 20% to 40% of the total width available for engagement to the lower grip strip 78. Likewise, each one of the ply-strip overlaps 94 may comprise approximately 10% to 20% of the total width of the upper and lower grip strips 76, 78. However, the ply-strip overlap 94 and grip strip overlap 96 may be provided in any relative amount and is not limited to that which is illustrated and disclosed herein.

It should also be noted that although the stabilizing mechanism 72 is illustrated in FIG. 4B as comprising a single one of the upper and lower grip strips 76, 78, any number of upper and lower grip strips 76, 78 may be provided in any arrangement relative to one another and to the upper and lower laminates 28, 30. For example, the stabilizing mechanism 72 may comprising a plurality of the upper grip strips 76, 78 which may be engaged to one another and to one or more of the upper and/or lower plies 32, 34. One of the upper grip strips 76 may at least partially overlap and engage the lower grip strip 78 which may be mounted to the tool 50. The upper grip strips 76 may at least partially overlap and engage the lower grip strip 78. The upper grip strips 76 may additionally at least partially overlap and engage one another in any one of a variety of different arrangements without limitation.

Referring briefly to FIG. 3, the lower grip strip 78 can be seen as extending underneath the lower plies 34 of the lower laminate 30. Plies P1, P2 and P3 are illustrated as terminating in staggered relationship 80 to one P1, P2 and P3 another such that a portion of at least one of the lower plies 34 is in direct engagement 82 with the lower grip strip 78. The upper grip strip 76 can be seen as being engaged to an outermost portion of the lower grip strip 78. Referring still to FIG. 3, the upper and lower grip strips 76, 78 are illustrated as extending along the perimeter 48 of the composite structure 10. In addition, the upper and lower grip strips 76, 78 are illustrated as extending along a width of the composite structure 10 in a continuous section or length of the material. However, the upper and lower grip strips 76, 78 may comprise any number of sections along perimeter 48 of the composite structure 10. In addition, the upper and lower grip strips 76, 78 may extend along portions of the perimeter 48 in a continuous manner or in an arrangement of sections of the upper and lower grip strips 76, 78.

Referring to FIG. 4B, shown is a tie strap 74 which may optionally be mounted to the tool 50 along the tool surface 54 and may be disposed in overlapping relation to the upper grip strip 76. The tie strap 74 may additionally overlap the uppermost one of the upper plies 32 of the upper laminate 28 by an amount illustrated as a tie strap overlap 98. The tie strap 74 may provide additional resistance against movement of the upper grip strip 76 relative to the lower grip strip 78. The tie strap 74 may be mounted to the tool surface 54 by any suitable means including, but not limited to, adhesive 92 bonding and/or by mechanical attachment.

The tie strap 74 may comprise individual sections of tape and/or may be formed as a strip of tape which may be extended along a length of the perimeter 48 or a width of the perimeter 48 as illustrated in FIG. 3. Referring still to FIG. 4B, the tie strap 74 may be mounted to the tool 50 and may overlap at least a portion of the upper grip strip 76 along a length thereof such as along the perimeter 48 of the structure 10. Referring to FIG. 4B, the lower grip strip 78 may be formed of any suitable material including a substantially thin metallic planar sheet member 78a which may include inner and outer surfaces 78b, 78c as was earlier indicated. In this regard, the lower grip strip 78 may be comprised of a single planar sheet member 78a having a generally elongate shape and which may include a plurality of protrusions 78e extending outwardly therefrom.

The protrusions 78e may comprise the engagement feature 78d for engaging the upper and/or lower laminates 28, 30. The protrusions 78e may extend outwardly to a height sufficient to engage at least one of the upper and lower plies 32, 34 of the upper and lower laminates 28, 30. For example, for a woven fiber prepreg having a thickness of approximately 0.007 inch, it is contemplated that the protrusions 78e may extend outwardly at least to a height that is substantially equivalent to a thickness of one of the plies 32, 34. In an embodiment, the protrusions 78e may have a height of at least approximately 0.010 inch to facilitate engagement to one of the plies 32, 34 to an extent sufficient to prevent movement or slippage of the plies 32, 34.

Referring to FIGS. 5A-5B, shown are perspective illustrations of embodiments of the upper and lower grip strips 76, 78. As can be seen in FIG. 5A, the upper grip strip 76 may comprise a pair of sheet members 76a. The sheet members 76a may be bonded or otherwise fastened together or connected such as at the inner surfaces 76b in back-to-back arrangement. As can be seen in FIG. 5B, the lower grip strip 78 may comprise a single one of the sheet members 78a. Each one of the sheet members 76a, 78a of the upper and lower grip strips 76, 78 may comprise sheet material formed of any suitable material. In an embodiment, the sheet members 76a, 78a may include engagement features 76d, 78d which may comprise a plurality of protrusions 76e, 78e extending outwardly from the respective outer surfaces 76c, 78c. In an embodiment, each one of the sheet members 76a, 78a may be formed of relatively thin (e.g., 0.005 inch) material of any composition. For example, the sheet members 76a, 78a may be formed of metallic material including, but not limited to, aluminum and stainless steel. The protrusions 76e, 78e may be stamped out of the sheet material such that the protrusions 76e, 78e are integrally formed with the sheet members 76a, 78a.

In this regard, each one of the sheet members 76a, 78a may include a plurality of perforations (not shown) which may facilitate the evacuation or egression of volatiles and other gasses which may be generated during the application of heat and/or pressure to the composite structure 10 (FIG. 4B) such as during consolidating and/or curing. In addition, each one of the upper and lower grip strips 76, 78 is preferably configured to facilitate suitable engagement to the upper and lower laminates 28, 30 (FIG. 4B) to prevent relative movement thereof. For example, the protrusions 76e, 78e extending outwardly from the upper and lower grip strips 76,78 may be configured to have a height sufficient to penetrate a thickness of at least one of the upper and lower plies 32, 34 (FIG. 4B) of the upper and lower laminates 28, 30 (FIG. 4B).

Referring still to FIGS. 5A-5B, the sheet members 76a, 78a from which the upper and lower grip strips 76, 78 may be formed may comprise any suitable material in any suitable configuration and are not limited to a metallic construction having protrusions 76e, 78e integrally formed into the sheet members 76a, 78a. For example, it is contemplated that each one of the sheet members 76a, 78a may comprise a sheet of grit material (not shown) for frictional engagement of the upper and lower plies 32, 34 (FIG. 4B) of the upper and lower laminates 28, 30 (FIG. 4B). In addition, the upper and lower grip strips 76, 78 may have a similar configuration which may facilitate interlocking or engagement of the upper grip strip 76 to the lower grip strip 78. However, the upper and lower grip strips 76, 78 may be fabricated of dissimilar materials and may be provided in different sizes, shapes and configurations and are not limited to a configuration where the upper grip strip 76 is formed of a pair of metallic sheet members 76a similar to that from which the lower grip strip 78 is formed. Furthermore, the configuration of the upper and lower grip strips 76, 78 as shown and described herein in not to be construed as limiting alternative embodiments of the upper and lower grip strips 76, 78.

Referring to FIG. 4B, the upper and lower grip strips 76, 78 may further comprise a portion of a system 70 for reducing core crush such as may occur in composite structures 10 having a chamfered core 20. The system 70 may include a force mechanism 116 which may be provided by an external pressure source such as autoclave pressure 110 or vacuum bag pressure (not shown). The force mechanism 116 may result in the application of compressive force 114 to the upper laminate 28 to increase the engagement of the upper and lower laminates 28, 30 to the upper and lower grip strips 76, 78. The application of compressive force 114 can be seen in FIG. 4B as acting upon the upper laminate 28 and which may be transmitted to the upper grip strip 76, lower laminate 30 and lower grip strip 78 in order to improve the engagement therebetween.

In this regard, the stabilizing mechanism 72 may provide an additional advantage in that an increase in compressive force 114 such as a result of autoclave pressure 110 may also result in an increase in the compressive force 114 applied to the upper laminate 28 which may, in turn, result in an increase in the engagement of the upper and lower laminates 28, 30 to the upper and lower grip strips 76, 78. In this regard, the stabilizing mechanism 72 facilitates an increase in the compressive force 114 applied to the upper laminate 28 in proportion to the increase in side force 108 or autoclave force 112 exerted on the chamfer 40. It is also contemplated that the force mechanism 116 may result from a vacuum drawn on a bagging film 56 as may be used for sealing the composite structure 10 to the tool 50. For example, as shown in FIG. 4B, the bagging film 56 may be secured or sealed to the tool surface 54 of the tool 50 by means of a sealant 58 such as sealant tape. The composite structure 10 may optionally include a breather layer 60, a bleeder layer 62, parting film 64 and/or other components associated with the fabrication of composite structures.

Referring still to FIG. 4B, the lower grip strip 78 may be configured such that the protrusions 78e extending outwardly therefrom are disposed in overlapping engagement with at least two of the upper plies 32 or lower plies 34. However, the stabilizing mechanism 72 may be configured such that any number of lower plies 34 may be disposed in overlapping relation to the lower grip strip 78. Likewise, the upper grip strip 76 may be configured such that at least two of the upper plies 32 or lower plies 34 are engaged thereby. However, as was earlier mentioned, the arrangement of the stabilizing mechanism 72 may be such that the upper grip strip 76 may be engaged to any number of the lower plies 34 and any number of upper plies 32 in addition to engagement with the lower grip strip 78.

Figure 6:
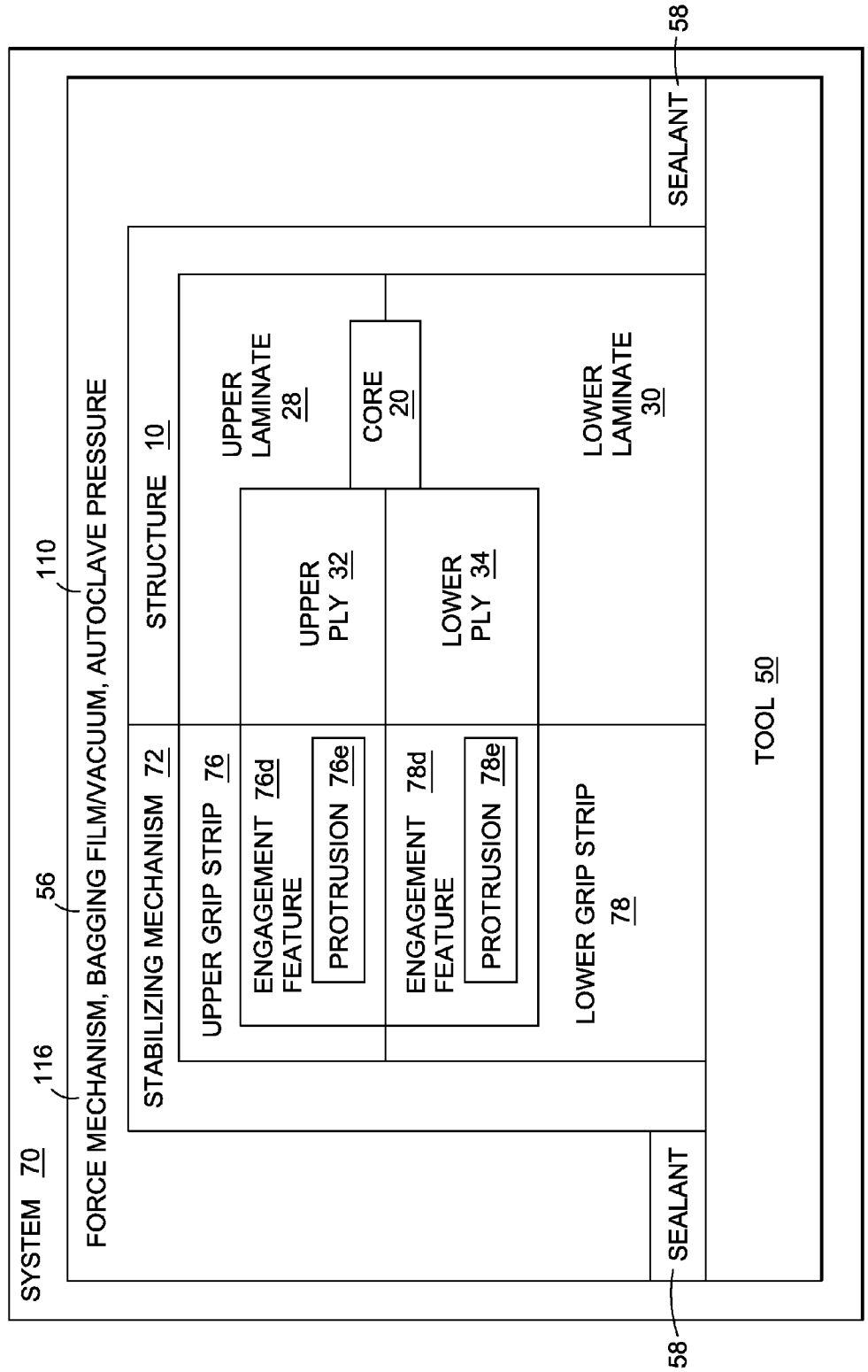
FIG. 6 is a block diagram of the stabilizing mechanism in an embodiment.

Referring to FIG. 6, shown is a block diagram of a system 70 for reducing core crush of core 20 of a composite structure 10. As was indicated earlier, the system 70 may comprise a tool 50 upon which the composite structure 10 may be mounted. The structure 10 may comprise the upper laminate 28 having upper plies 32 and the lower laminate 30 having lower plies 34 and between which the core 20 is sandwiched. The perimeter of the composite structure 10 may be engaged to the stabilizing mechanism 72 having the lower grip strip 78 mounted to the tool 50. As indicated above, the stabilizing mechanism 72 may be comprised of the lower grip strip 78 having an outer surface including at least one engagement feature 78d such as a protrusion 78e for engaging at least one of the upper and lower laminates 28, 30. Likewise, the upper grip strip 76 may have opposing outer surfaces 76c wherein each of the outer surfaces 76c may include at least one engagement feature 76d such as a protrusion 76e for engaging the lower grip strip 78 and for engaging at least one of the upper and lower laminates 28, 30. In addition, the system 70 may comprise a force mechanism 116 such as autoclave pressure 110 or a bagging film 56 under vacuum pressure for applying a compressive force to the upper laminate 28 in order to increase the engagement of the upper and lower laminates 28, 30 to the upper and lower grip strips 76, 78.

Figure 7:
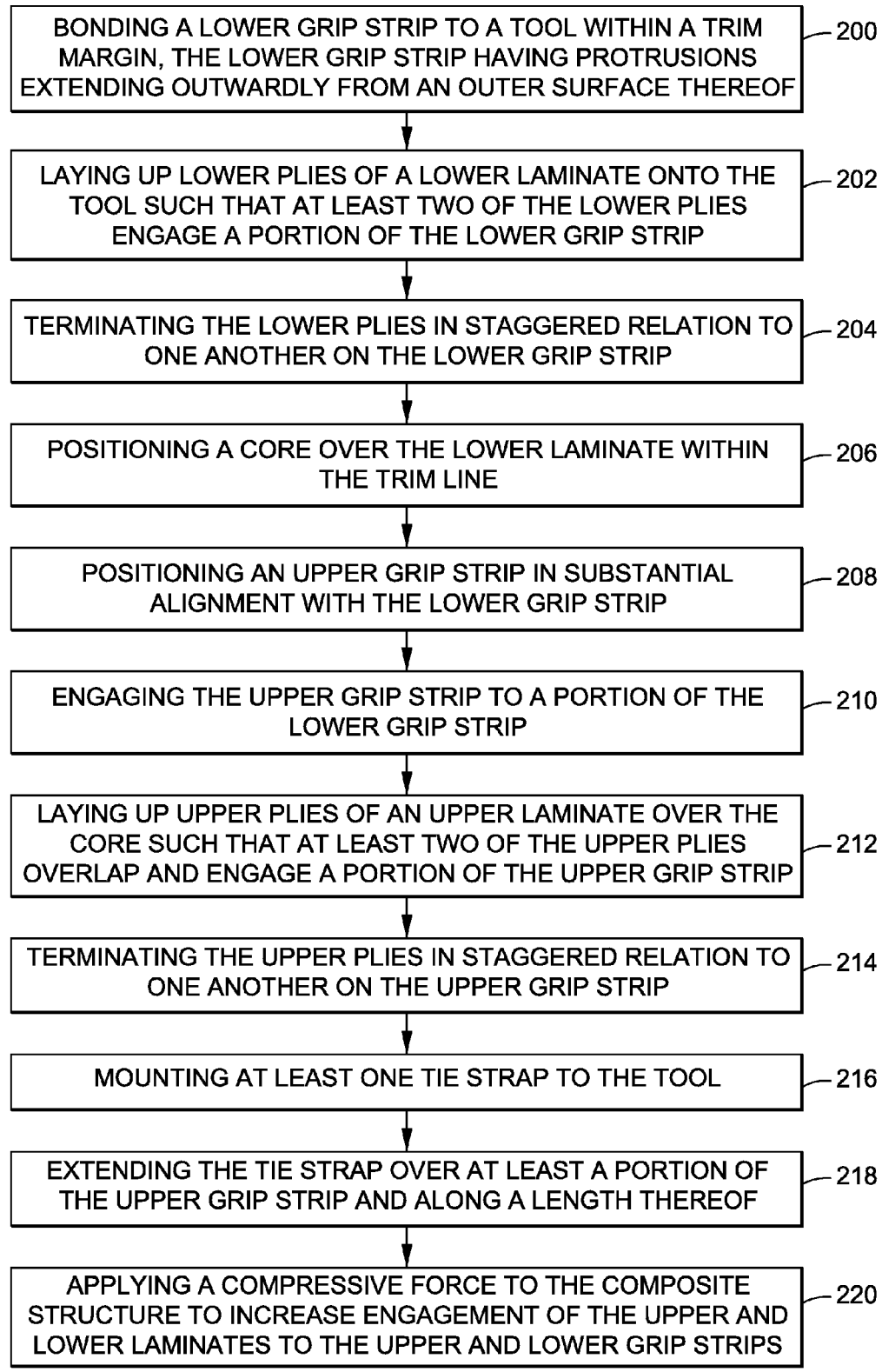
FIG. 7 is an illustration of a flow diagram for a method for reducing core crush in a chamfered core of a composite structure.

Referring now to FIG. 7, shown is a flow diagram illustrating a methodology for reducing core crush 100 in a chamfered 40 core 20 such as the core 20 of the composite structure 10 illustrated in FIGS. 2-4B. As illustrated in FIG. 7, the methodology may include step 200 of bonding the lower grip strip 78 to the tool 50 within the trim margin 46 as illustrated in FIG. 4B. The lower grip strip 78 may be mounted to the tool 50 by any means and is not limited to bonding. For example, the lower grip strip 78 may be mechanically fastened to the tool 50. As was indicated earlier, the lower grip strip 78 may include engagement features such as a plurality of protrusions 78e extending outwardly from the outer surface 78c of the lower grip strip 78. Step 202 of the methodology may include laying up lower plies 34 of the lower laminate 30 onto the tool 50. For example, FIG. 4B illustrates plies P1, P2 and P3 which may comprise the lower plies 34 of the lower laminate 30. Such plies may be laid up on the tool 50 such that at least two of the lower plies 34 (i.e., P1 and P2) are in engagement with at least a portion of the lower grip strip 78. For example, as illustrated in FIG. 4B, plies P1, P2 and P3 are disposed in overlapping relation to the lower grip strip 78 such that a portion of the lower grip strip 78 remains exposed.

Referring still to FIG. 7, step 204 may comprise terminating the lower plies 34 in staggered relation to one another on the lower grip strip 78 such that each ply defines a ply-strip overlap providing a predetermined amount of engagement of each one of the plies with the lower grip strip 78 as illustrated in FIG. 4B. Step 206 may comprise positioning the core 20 such as the honeycomb core 20 described above over the lower laminate 30. In this regard, the honeycomb core 20 may be machined to size including forming chamfers in the core 20 for layup of the upper and lower plies 32, 34 of the upper and lower laminates 28, 30 onto the core. The core 20 is preferably sized within the final shape of the composite structure 10 after addition of the upper and lower laminates 28, 30. Step 208 may comprise positioning the upper grip strip 76 in substantial alignment with the lower grip strip 78. For example, the upper grip strip 76 is illustrated as having a width similar to the lower grip strip 78 as shown in FIG. 4B wherein the upper grip strip 76 is illustrated as being positioned over the lower grip strip 78 within the trim margin 46 of the layup in FIG. 4B. Step 210 may comprise engaging the upper grip strip 76 to a portion of the lower grip strip 78.

Referring still to FIG. 7, step 212 may comprise laying up the upper plies 32 of the upper laminate 28 over the core 20 such that at least two of the upper plies 32 overlap and engage a portion of the upper grip strip 76 as illustrated in FIG. 4B.

For example, FIG. 4B illustrate plies P4 and P5 disposed on opposing sides of the upper grip strip 76 and in direct contact therewith. In addition, ply P6 of the upper plies 32 is illustrated in FIG. 4B as being in overlapping relation to the upper grip strip 76 on a top side thereof. In this regard, the methodology comprises step 214 of terminating the upper plies 32 in staggered relation to one another on the upper grip strip 76 in order to facilitate attachment of a maximum number of plies to the upper grip strip 76.

Referring to FIG. 7, step 216 may comprise mounting at least one tie strap 74 to the tool 50 as illustrated in FIG. 4B in order to increase the resistance against ply movement. As indicated above, the tie strap 74 may comprise a material extending along a length of the upper grip strip 76. The tie strap 74 may comprise a tape-like material which may be applied in sections or as in continuous length along each one of the sides of the composite structure 10 at the perimeter 48 as illustrated in FIG. 3. In this regard, FIG. 4B illustrates that a portion of the ply is directly engageable to the top of the upper grip strip 76 to provide increased resistance to movement thereof. Step 218 may comprise extending the tie strap 74 over at least a portion of the upper grip strip 76 and along a length thereof.

Referring still to FIG. 7, step 220 may comprise applying the compressive force 114 to the composite structure 10. A main result of application of the compressive force 114 may be to consolidate the upper and lower laminates 28, 30 and core 20 of the composite structure 10 with a secondary result of increasing engagement of the upper and lower laminates 28, 30 to the upper and lower grip strips 76, 78. As indicated above, the application of such compressive force 114 may be facilitated by the placing of the composite structure 10 within a bagging film 56 which may be sealed to the tool surface 54 by means of the sealant 58 as illustrated in FIG. 4B. A vacuum may be drawn on the bagging film 56 in order to generate the compressive force which is exerted on the stabilizing mechanism 72. Alternatively, the application of compressive force 114 to the composite structure 10 may also include the application of autoclave pressure on the composite structure 10 such as may occur within during an autoclave operation for consolidation or curing of the composite structure 10 as was described above.

The method may further comprise laying up the upper and lower laminates 28, 30 such that at least one of the upper and lower plies 32, 34 engages both the upper and lower grip strips 76, 78. In this manner, movement of the plies may be reduced or prevented. The method may further comprise laying up the upper laminate 28 over the core 20 such that a portion of the upper laminate 28 overlaps the lower laminate 30 and engages the upper grip strip 76. As was also indicated above, the upper laminate 28 comprises upper plies 32 which may be terminated to the upper grip strip 76 in staggered relation to one another. Likewise, the lower plies 34 of the lower laminate 30 may be laid up such that at least two of the lower plies 34 are arranged in staggered relation to one another over the lower grip strip 78.

Figure 8:
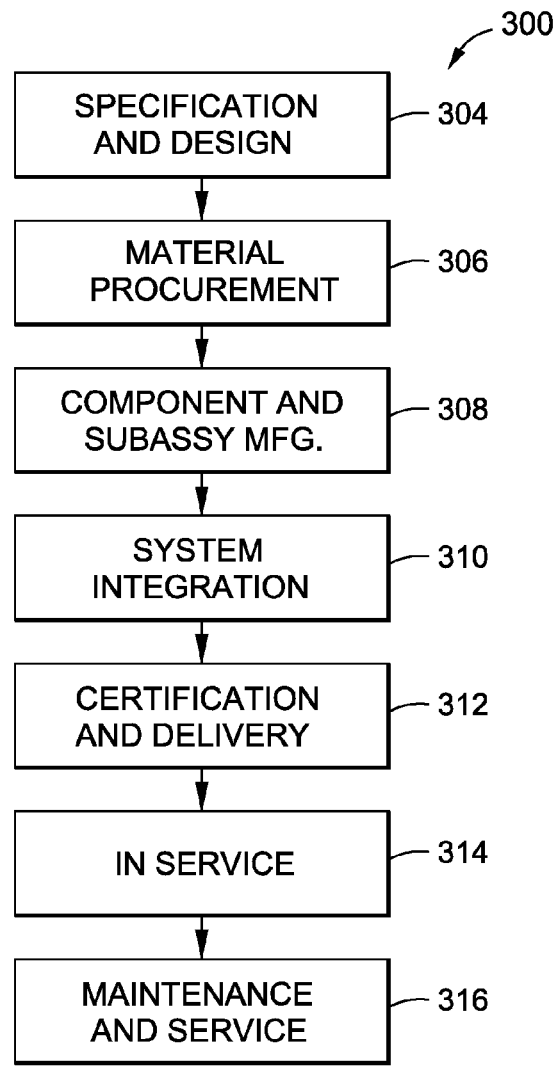
FIG. 8 is a flow diagram of an aircraft production and service methodology.
Figure 9:
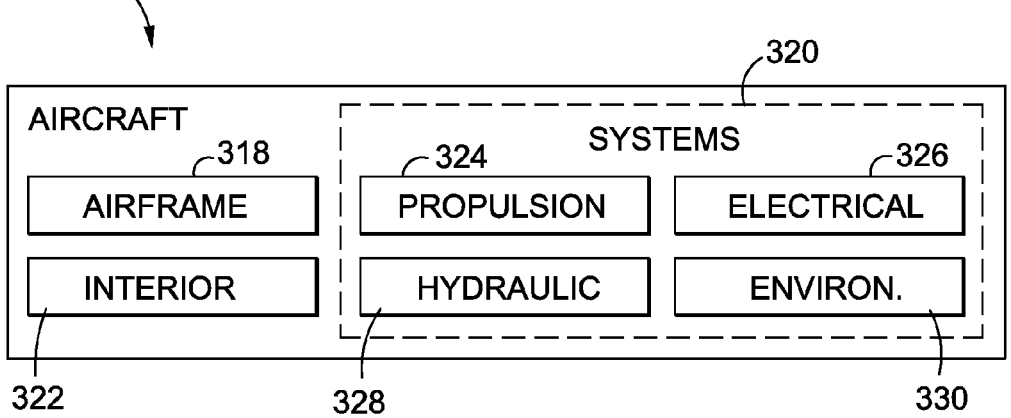
FIG. 9 is a block diagram of an aircraft.

Referring to FIGS. 8-9, embodiments of the disclosure may be described in the context of an aircraft manufacturing and service method 300 as shown in FIG. 8 and an aircraft 302 as shown in FIG. 9. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service 314 by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service 314. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service 314, for example and without limitation, to maintenance and service 316.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A stabilizing mechanism for resisting relative movement of upper and lower laminates of a composite structure having a core, the stabilizing mechanism comprising:
   a lower grip strip mounted to a tool and having an outer surface including at least one engagement feature for engaging at least one of the upper and lower laminates; and
   at least one upper grip strip having opposing outer surfaces, each one of the outer surfaces including at least one of the engagement features for engaging the lower grip strip and at least one of the upper and lower laminates.

2. The stabilizing mechanism of claim 1 wherein:
   the engagement feature comprises a plurality of protrusions.

3. The stabilizing mechanism of claim 1 wherein:
   the lower grip strip comprises a sheet member having inner and outer surfaces and the protrusions extending from the outer surface.

4. The stabilizing mechanism of claim 3 wherein:
   the upper grip strip comprises a pair of the sheet members connected in back-to-back arrangement at the inner surfaces such that the protrusions extend outwardly from the respective outer surfaces.

5. The stabilizing mechanism of claim 1 wherein:
   the composite structure includes a perimeter having a trim line defining a trim margin of the composite structure; and
   the upper and lower grip strips being located within the trim margin.

6. The stabilizing mechanism of claim 5 wherein:
   the upper and lower grip strips are substantially aligned with one another.

7. The stabilizing mechanism of claim 1 further comprising:
   at least one tie strap mounted to the tool and overlapping a portion of the upper grip strip.

8. The stabilizing mechanism of claim 1 further comprising:
   a bagging film sealing the composite structure to the tool for applying compressive force on the upper and lower laminates to increase engagement with the upper and lower grip strips.

9. A stabilizing mechanism for resisting relative movement of upper and lower laminates mounted to a chamfered core of a composite structure to prevent core crush of the chamfered core under the application of autoclave force to the chamfered core, the upper and lower laminates being respectively mounted to upper and lower surfaces of the core, the upper and lower laminates being respectively comprised of upper and lower plies, the composite structure having a perimeter including a trim line defining a trim margin, the stabilizing mechanism comprising:
   a lower grip strip bonded to the tool within the trim margin and including a generally elongate metallic sheet member having inner and outer surfaces and including a plurality of protrusions extending outwardly from the outer surface, the protrusions from the lower grip strip engaging at least two of the plies for preventing movement relative to the lower grip strip;
   at least one upper grip strip in substantial alignment with the lower grip strip and comprising a pair of the sheet members bonded at the inner surfaces in back-to-back arrangement and each having a plurality of the protrusions extending outwardly from the respective outer surfaces, the protrusions from the upper grip strip engaging the lower grip strip for preventing movement relative thereto and engaging at least two of the plies on opposing sides of the upper grip strip for preventing movement of the plies relative to the upper grip strip;
   at least one tie strap mounted to the tool and overlapping a portion of the upper grip strip; and
   a bagging film sealing the composite structure to the tool for applying compressive force on the upper and lower laminates to increase engagement with the upper and lower grip strips.

10. A system for resisting relative movement of upper and lower laminates mounted to a chamfered core of a composite structure to reduce core crush of the chamfered core, the system comprising:
    a tool for receiving the composite structure;
    a stabilizing mechanism, including:
        a lower grip strip mounted to the tool and having an outer surface including at least one engagement feature for engaging at least one of the upper and lower laminates; and
        at least one upper grip strip having opposing outer surfaces each including at least one engagement feature for engaging the lower grip strip and at least one of the upper and lower laminates; and a force mechanism for applying a compressive force to the upper laminate for increasing the engagement of the upper and lower laminates to the upper and lower grip strips.

11. The system of claim 10 wherein the force mechanism comprises at least one of the following:
a bagging film for sealing the composite structure to the tool and drawing a vacuum thereon; and
autoclave pressure applied to the composite structure.

12. The system of claim 10 wherein:
the engagement feature comprises a plurality of protrusions.

13. The system of claim 12 wherein:
the lower grip strip comprises a sheet member having inner and outer surfaces, the protrusions extending from the outer surface.

14. The system of claim 13 wherein:
the upper grip strip comprises a pair of the sheet members connected in back-to-back arrangement at the inner surfaces such that the protrusions extend outwardly from the respective outer surfaces.

\* \* \* \* \*